US011783591B2

(12) United States Patent
Pillai et al.

(10) Patent No.: US 11,783,591 B2
(45) Date of Patent: Oct. 10, 2023

(54) USING A MULTIMODE NEURAL NETWORK TO DETERMINE A REPRESENTATION OF A SPATIAL STRUCTURE OBJECTS IN AN IMAGE

(71) Applicant: Toyota Research Institute, Inc., Los Altos, CA (US)

(72) Inventors: Sudeep Pillai, Santa Clara, CA (US); Vitor Guizilini, Santa Clara, CA (US); Rares A. Ambrus, San Fransisco, CA (US); Adrien David Gaidon, Mountain View, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 690 days.

(21) Appl. No.: 16/898,541

(22) Filed: Jun. 11, 2020

(65) Prior Publication Data
US 2021/0387649 A1 Dec. 16, 2021

(51) Int. Cl.
*G06V 20/56* (2022.01)
*G06N 3/08* (2023.01)
*G06F 18/214* (2023.01)
*G06N 3/045* (2023.01)
*B60W 60/00* (2020.01)
*G06V 10/82* (2022.01)

(52) U.S. Cl.
CPC ......... *G06V 20/56* (2022.01); *B60W 60/0025* (2020.02); *G06F 18/214* (2023.01); *G06N 3/045* (2023.01); *G06N 3/08* (2013.01); *G06V 10/82* (2022.01); *B60W 2556/50* (2020.02)

(58) Field of Classification Search
CPC ........... B60W 60/0025; B60W 2556/50; G06F 18/214; G06N 3/048; G06N 3/08; G06V 10/82
See application file for complete search history.

(56) References Cited

U.S. PATENT DOCUMENTS

| 8,259,160 B2 | 9/2012 | Ishikawa et al. |
| 2016/0223651 A1* | 8/2016 | Kamo ................... G01S 13/426 |

(Continued)

OTHER PUBLICATIONS

Godard et al., "Digging Into Self-Supervised Monocular Depth Estimation," Aug. 17, 2019, pp. 3828-3838, Computer Vision Foundation.

(Continued)

*Primary Examiner* — Charles J Han
(74) *Attorney, Agent, or Firm* — Christopher G. Darrow; Darrow Mustafa PC

(57) ABSTRACT

A representation of a spatial structure of objects in an image can be determined. A mode of a neural network can be set, in response to a receipt of the image and a receipt of a facing direction of a camera that produced the image. The mode can account for the facing direction. The facing direction can include one or more of a first facing direction of a first camera disposed on a vehicle or a second facing direction of a second camera disposed on the vehicle. The neural network can be executed, in response to the mode having been set, to determine the representation of the spatial structure of the objects in the image. The representation of the spatial structure of the objects in the image can be transmitted to an automotive navigation system to determine a distance between the vehicle and a specific object in the image.

20 Claims, 8 Drawing Sheets

(56) References Cited

U.S. PATENT DOCUMENTS

2018/0315244 A1    11/2018  Thompson
2019/0325746 A1*   10/2019  Lewis ..................... G06F 3/013
2020/0074239 A1*   3/2020   Park ...................... G06F 18/217

OTHER PUBLICATIONS

Won et al., "SweepNet: Wide-baseline Omnidirectional Depth Estimation," Aug. 16, 2019, 7 pages, Department of Computer Science, Hanyang University, Seoul, Korea.
Unknown, "Geometric transformations in 3D and coordinate frames," 2018, 33 pages, University of California, San Diego.
Cui et al., "Real-Time Dense Mapping for Self-Driving Vehicles using Fisheye Cameras," Apr. 18, 2019, 7 pages.
Jacob Schennings, "Deep Convolutional Neural Networks for Real-Time Single Frame Monocular Depth Estimation," Dec. 2017, 70 pages, Uppsala Universitet, Sweden.
Wang et al., "Pseudo-LiDAR from Visual Depth Estimation: Bridging the Gap in 3D Object Detection for Autonomous Driving," Jun. 14, 2019, pp. 8445-8453.
Unknown, "3D pose estimation," https://en.wikipedia.org/wiki/3D_pose_estimation (last accessed Feb. 23, 2020, 4 pages.).
Madeline Schiappa, "Recognizing Depth in Autonomous Driving," Towards Data Science, (last accessed Feb. 24, 2020.).
Ronneberger et al., "U-Net: Convolutional Networks for Biomedical Image Segmentation," May 18, 2015, 8 pages.

\* cited by examiner a)

b)

a) 416

| NODES | INPUTS | WEIGHTS |
|---|---|---|
| 502 | 502-1 | $W_1 = V_{01}$ |
| 502 | 502-2 | $W_2 = V_{02}$ |
| 504 | 504-1 | $W_3 = V_{03}$ |
| 504 | 504-2 | $W_4 = V_{04}$ |
| 512 | 512-1 | $W_5 = V_{05}$ |
| 512 | 512-2 | $W_6 = V_{06}$ |
| 514 | 514-1 | $W_7 = V_{07}$ |
| 514 | 514-2 | $W_8 = V_{08}$ |
| 520 | 520-1 | $W_9 = V_{09}$ |
| 520 | 520-2 | $W_{10} = V_{10}$ | b) 418

| NODES | INPUTS | WEIGHTS |
|---|---|---|
| 502 | 502-1 | $W_1 = V_{11}$ |
| 502 | 502-2 | $W_2 = V_{12}$ |
| 504 | 504-1 | $W_3 = V_{13}$ |
| 504 | 504-2 | $W_4 = V_{14}$ |
| 512 | 512-1 | $W_5 = V_{15}$ |
| 512 | 512-2 | $W_6 = V_{16}$ |
| 514 | 514-1 | $W_7 = V_{17}$ |
| 514 | 514-2 | $W_8 = V_{18}$ |
| 520 | 520-1 | $W_9 = V_{19}$ |
| 520 | 520-2 | $W_{10} = V_{20}$ | c) 420

| NODES | INPUTS | WEIGHTS |
|---|---|---|
| 502 | 502-1 | $W_1 = V_{21}$ |
| 502 | 502-2 | $W_2 = V_{22}$ |
| 504 | 504-1 | $W_3 = V_{23}$ |
| 504 | 504-2 | $W_4 = V_{24}$ |
| 512 | 512-1 | $W_5 = V_{25}$ |
| 512 | 512-2 | $W_6 = V_{26}$ |
| 514 | 514-1 | $W_7 = V_{27}$ |
| 514 | 514-2 | $W_8 = V_{28}$ |
| 520 | 520-1 | $W_9 = V_{29}$ |
| 520 | 520-2 | $W_{10} = V_{30}$ |

FIG. 6

USING A MULTIMODE NEURAL NETWORK TO DETERMINE A REPRESENTATION OF A SPATIAL STRUCTURE OBJECTS IN AN IMAGE

TECHNICAL FIELD

The disclosed technologies are directed to using a multimode neural network to determine a representation of a spatial structure of objects in an image. Specifically, the disclosed technologies are directed to using a multimode neural network to determine a representation of a spatial structure of objects in an image in an environment in which the image can have been produced by different cameras, disposed on a vehicle in motion, that have different facing directions.

BACKGROUND

Operation of an autonomous vehicle can depend upon an ability to determine distances between the autonomous vehicle and objects that surround the autonomous vehicle throughout a range of 360 degrees. A light detection and ranging (LIDAR) system can be used for this function. The LIDAR system can include a laser. The LIDAR system can cause the laser to emit pulses of a coherent light. Beams of the coherent light can be reflected from points on the objects that surround the autonomous vehicle. The LIDAR system can measure times of flight between emissions of the pulses and receptions of the beams reflected from the points. The distances between the autonomous vehicle and the objects can be determined from the times of flight. A coordinate system for each point can include a first coordinate that defines a position of the point with respect to the autonomous vehicle and a second coordinate that defines a distance between the autonomous vehicle and the point. A set of coordinates for the points can be referred to as a point cloud. The point cloud can be a representation of the objects that surround the autonomous vehicle. Unfortunately, a LIDAR system can be expensive.

However, techniques have been developed to determine a representation of a spatial structure of objects in one or more images produced by one or more cameras. These techniques can involve analyses of the one or more images to produce depth estimates. The distances between the autonomous vehicle and the objects can be determined from the depth estimates. By using a plurality of cameras, the representation of the spatial structure can be for the objects that surround the autonomous vehicle throughout the range of 360 degrees. Such a representation can be referred to as pseudo-LIDAR representation. For example, the plurality of cameras can include a camera that has a forward facing direction, cameras that have side facing directions, and a camera that has a rear facing direction.

Neural networks can be effective tools for implementing such techniques. Efforts to use neural networks for this purpose can generally be classified into two categories. In a first category, images from each of the plurality of cameras can be received by a single neural network that implements a single depth model. The single neural network can have been trained using images from all of the plurality of cameras. Unfortunately, results produced from such a single depth model can be of a poor quality because of difficulties associated with using a single depth model to produce both a depth estimate from an image produced by a camera that has a facing direction in line with a path of travel of the autonomous vehicle (e.g., a forward facing direction or a rear facing direction) and a depth estimate from an image produced by a camera that has a facing direction orthogonal to the path of travel of the autonomous vehicle (e.g., a side facing direction). In a second category, an image from one of the plurality of cameras can be received by a corresponding neural network that implements a corresponding depth model. Unfortunately, such an approach can require long durations of time to perform training operations of the plurality of neural networks. Additionally, such an approach can require a substantial amount of memory to store the plurality of neural networks and to operate the plurality of neural networks concurrently.

SUMMARY

In an embodiment, a system for determining a representation of a spatial structure of objects in an image can include one or more processors and a memory. The memory can be communicably couple to one or more processors. The memory can store a setting module, a neural network execution module, and a communications module. The setting module can include instructions that when executed by the one or more processors cause the one or more processors to set a mode of a neural network in response to a receipt of the image and a receipt of a facing direction of a camera that produced the image. The mode can account for the facing direction. The facing direction can include one or more of a first facing direction of a first camera disposed on a vehicle or a second facing direction of a second camera disposed on the vehicle. The neural network execution module can include instructions that when executed by the one or more processors cause the one or more processors to execute, in response to the mode having been set, the neural network to determine the representation of the spatial structure of the objects in the image. The communications module can include instructions that when executed by the one or more processors cause the one or more processors to transmit the representation of the spatial structure of the objects in the image to an automotive navigation system. The automotive navigation system can be configured to use the representation of the spatial structure of the objects in the image to determine a distance between the vehicle and a specific object in the image.

In another embodiment, a method for determining a representation of a spatial structure of objects in an image can include setting, by a processor, a mode of a neural network in response to a receipt of the image and a receipt of a facing direction of a camera that produced the image. The mode can account for the facing direction. The facing direction can include one or more of a first facing direction of a first camera disposed on a vehicle or a second facing direction of a second camera disposed on the vehicle. The method can include executing, by the processor and in response to the mode having been set, the neural network to determine the representation of the spatial structure of the objects in the image. The method can include transmitting, by the processor, the representation of the spatial structure of the objects in the image to an automotive navigation system. The automotive navigation system can be configured to use the representation of the spatial structure of the objects in the image to determine a distance between the vehicle and a specific object in the image.

In another embodiment, a non-transitory computer-readable medium for determining a representation of a spatial structure of objects in an image can include instructions that when executed by one or more processors cause the one or more processors to set a mode of a neural network in response to a receipt of the image and a receipt of a facing direction of a camera that produced the image. The mode can account for the facing direction. The facing direction can include one or more of a first facing direction of a first camera disposed on a vehicle or a second facing direction of a second camera disposed on the vehicle. The non-transitory computer-readable medium can include instructions that when executed by one or more processors cause the one or more processors to execute, in response to the mode having been set, the neural network to determine the representation of the spatial structure of the objects in the image. The non-transitory computer-readable medium can include instructions that when executed by one or more processors cause the one or more processors to transmit the representation of the spatial structure of the objects in the image to an automotive navigation system. The automotive navigation system can be configured to use the representation of the spatial structure of the objects in the image to determine a distance between the vehicle and a specific object in the image.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 6 includes tables that illustrate examples of files of node data, according to the disclosed technologies.

DETAILED DESCRIPTION

A neural network can be a computing system configured to perform a task using an approach modeled upon a manner in which a brain processes information through neurons. An artificial neuron, also referred to as a node, can be a basic element of the neural network. The node can be configured to receive one or more inputs and to produce an output of a function. Each of the one or more inputs can be multiplied by a value of a weight to produce a weighted input. A sum of weighted inputs can be an argument of the function of the node. In the field of computer vision, a neural network can be an effective tool for using a depth model and a pose model to perform the task of producing a three dimensional representation from one or more two dimensional images. The disclosed technologies are directed to using a multimode neural network to determine a representation of a spatial structure of objects in an image (e.g., a three dimensional representation) in an environment in which one or more two dimensional images can have been produced by different cameras, disposed on a vehicle in motion, that have different facing directions.

The disclosed technologies can be used to determine a representation of a spatial structure of objects in an image. A mode of a neural network can be set, in response to a receipt of the image and a receipt of a facing direction of a camera that produced the image. The mode can account for the facing direction. The facing direction can include one or more of a first facing direction of a first camera disposed on a vehicle or a second facing direction of a second camera disposed on the vehicle. The neural network can be executed, in response to the mode having been set, to determine the representation of the spatial structure of the objects in the image (e.g., the depth estimate). The representation of the spatial structure of the objects in the image can be transmitted to an automotive navigation system. The automotive navigation system can be configured to use the representation of the spatial structure of the objects in the image to determine a distance between the vehicle and a specific object in the image.

Figure 1:
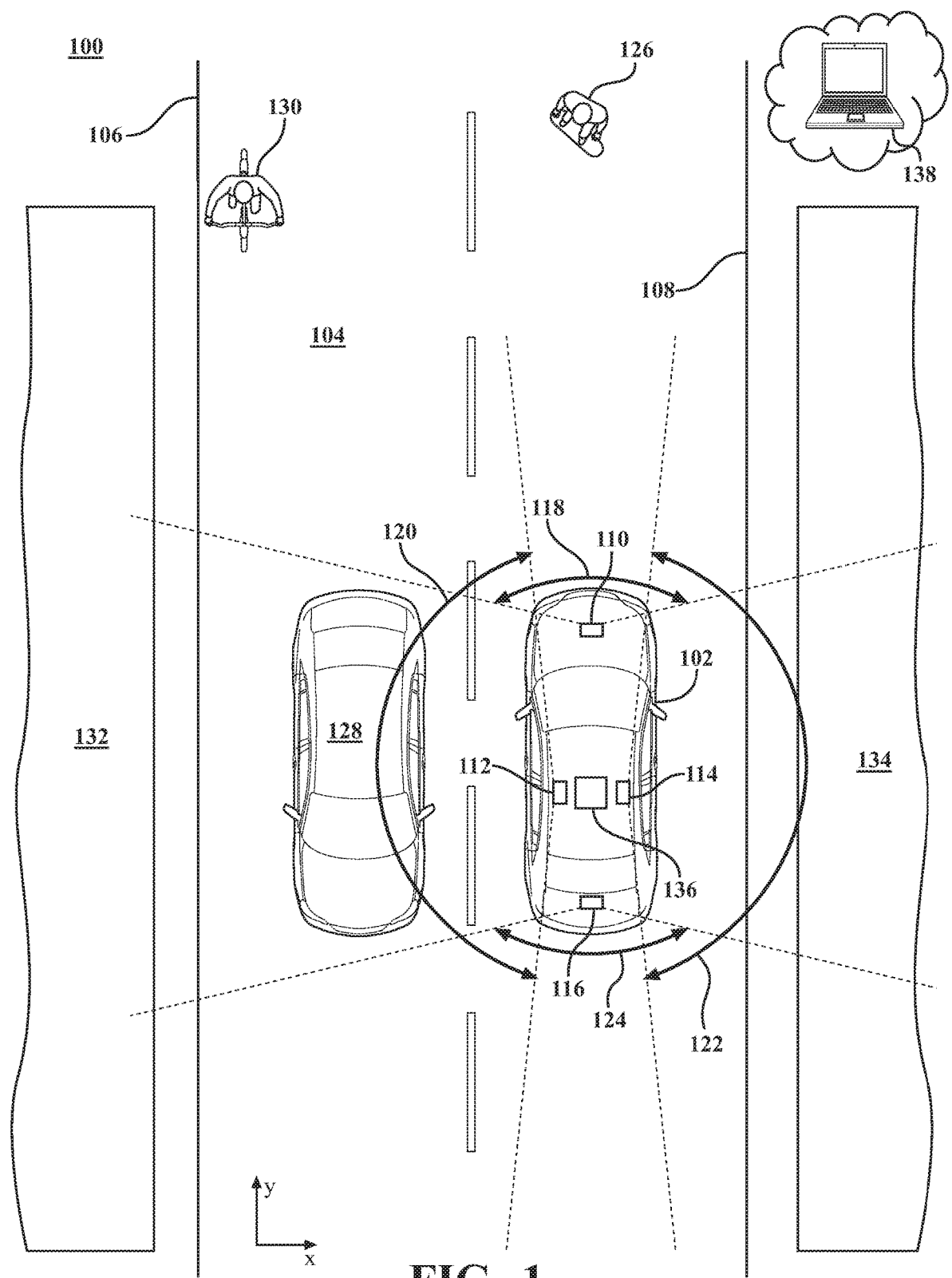
FIG. 1 includes a diagram that illustrates an example of an environment for using a multimode neural network to determine a representation of a spatial structure of objects in an image at a first time ($t_1$), according to the disclosed technologies.

FIG. 1 includes a diagram that illustrates an example of an environment 100 for using a multimode neural network to determine a representation of a spatial structure of objects in an image at a first time ($t_1$), according to the disclosed technologies. For example, the environment 100 can include a vehicle 102. For example, the vehicle 102 can be in motion on a road 104 having a first edge 106 and a second edge 108. For example, disposed on the vehicle 102 can be a first camera 110, a second camera 112, a third camera 114, and a fourth camera 116. The first camera 110 can have a forward facing direction with a first field of view 118. The second camera 112 can have a left facing direction with a second field of view 120. The third camera 114 can have a right facing direction with a third field of view 122. The fourth camera 116 can have a rear facing direction with a fourth field of view 124. For example, any of the first field of view 118, the second field of view 120, the third field of view 122, or the fourth field of view 124 can at least partially overlap with an adjacent field of view as illustrated in FIG. 1. Alternatively, none of the first field of view 116, the second field of view 120, the third field of view 122, or the fourth field of view 124 can overlap with an adjacent field of view. The environment 100 can include, for example, a first object 126 (e.g., a person on a skateboard), a second object 128 (e.g., another vehicle), a third object 130 (e.g., a person on a bicycle), a fourth object 132 (e.g., a first building), and a fifth object 134 (e.g., a second building). Additionally, for example, the vehicle 102 can include an automotive navigation system 136. Additionally, for example, the environment 100 can include a "connected car" cloud platform 138 that can exchange communications with the vehicle 102.

Figure 2:
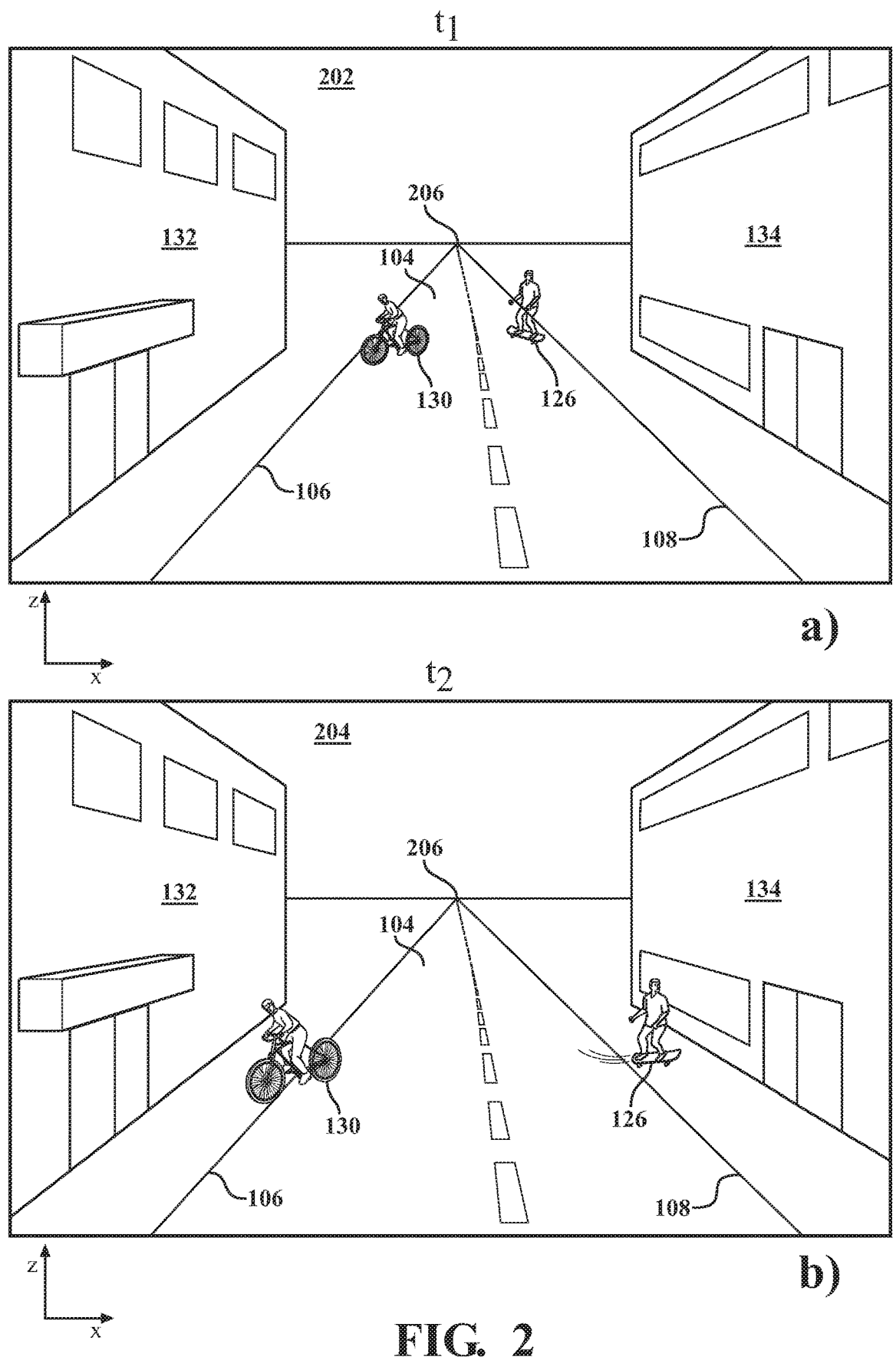
FIG. 2 includes diagrams that illustrate examples of images produced by a first camera, according to the disclosed technologies.

FIG. 2 includes diagrams that illustrate examples of images produced by the first camera 110, according to the disclosed technologies. A view (a) of FIG. 2 can be an example of an image 202 produced at the first time ($t_1$). A view (b) of FIG. 2 can be an example of an image 204 produced at a second time ($t_2$). The first field of view 118 of the first camera 110 can be in line with the path of travel of the vehicle 102 (illustrated in FIG. 1). For example, the first field of view 118 often can be characterized by a perspective view of the road 104 that includes a vanishing point 206 where the horizon meets the sky. For example, the first field of view 118 often can include buildings (e.g., the first building 132 and the second building 134) on sides of the road 104. Because the first camera 110 can be disposed on the vehicle 102, if the road 104 has an inclination, then the vehicle 102 may have the inclination such that the road 104 can be perceivable, in the first field of view 118, as lacking the inclination. Because the first field of view 118 can be in line with the path of travel of the vehicle 102, changes in positions of objects (e.g., the first object 126 (e.g., the person on the skateboard) and the third object 130 (e.g., the person on the bicycle) from the first time ($t_1$) to the second time ($t_2$) can be perceivable, in the first field of view 118, as consistent with a real relative motion between such objects and the vehicle 102. For example, in the image 202 (at the first time ($t_1$)) the first object 126 (e.g., the person on the skateboard) can be on the road 104, while in the image 204 (at the second time ($t_2$)) the first object 126 (e.g., the person on the skateboard)) can be airborne above the road 104.

Figure 3:
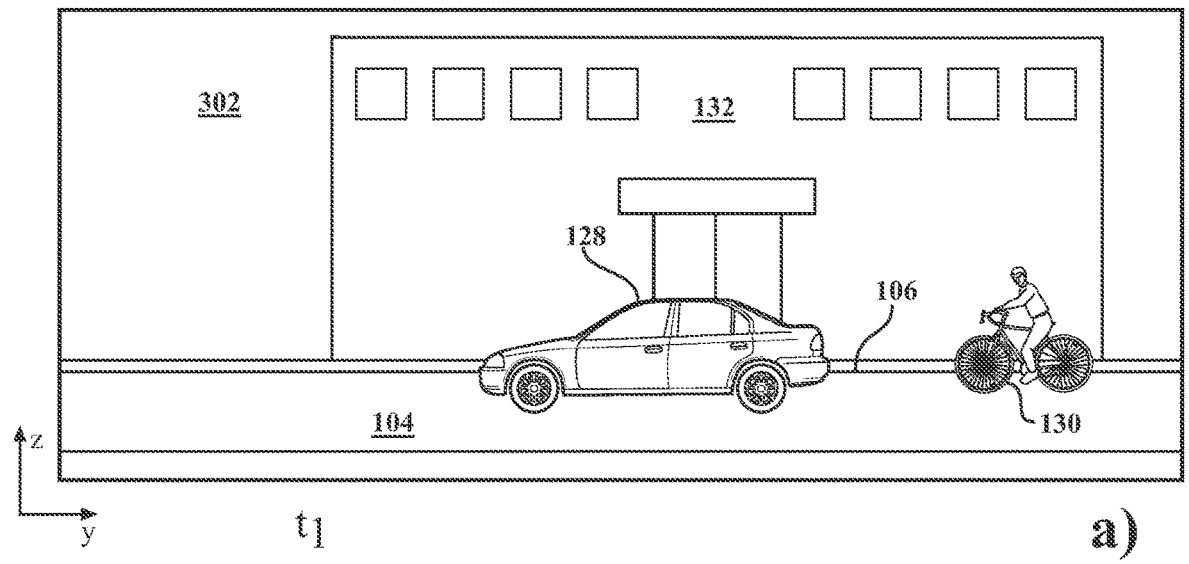
FIG. 3 includes diagrams that illustrate examples of images produced by a second camera, according to the disclosed technologies FIG. 4 includes a block diagram that illustrates an example of a system for determining the representation of the spatial structure of the objects in the image, according to the disclosed technologies.
Figure 3:
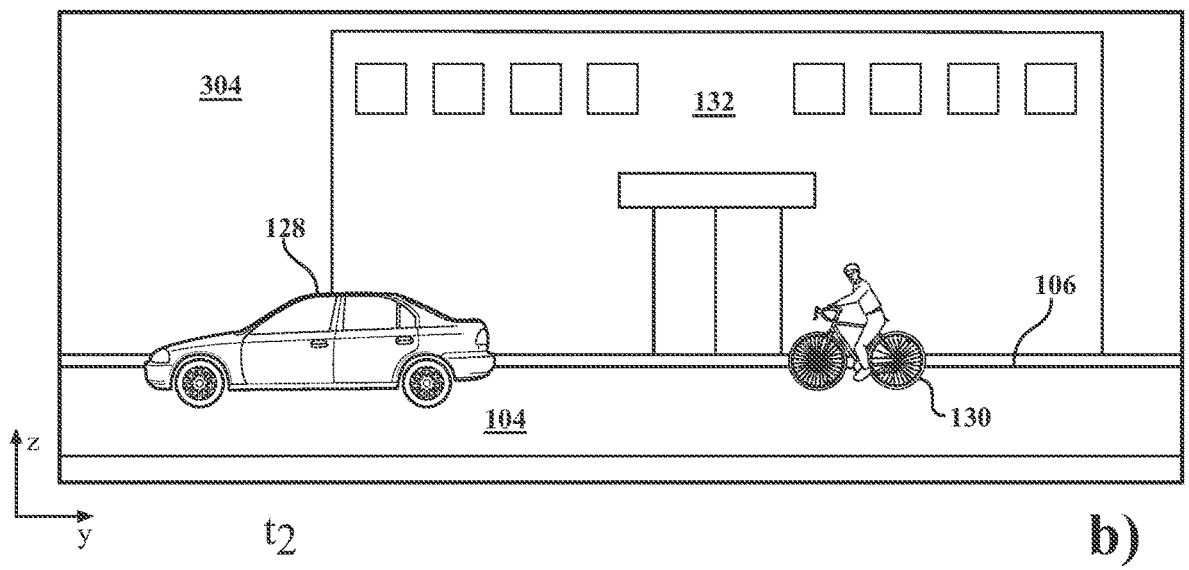

FIG. 3 includes diagrams that illustrate examples of images produced by the second camera 112, according to the disclosed technologies. A view (a) of FIG. 3 can be an example of an image 302 produced at the first time ($t_1$). A view (b) of FIG. 3 can be an example of an image 304 produced at the second time ($t_2$). The second field of view 120 of the second camera 112 can be orthogonal to the path of travel of the vehicle 102 (illustrated in FIG. 1). For example, the second field of view 120 often can include buildings (e.g., the first building 132) on sides of the road 104. Because the second field of view 120 can be orthogonal to the path of travel of the vehicle 102, changes in positions of objects (e.g., the second object 128 (e.g., the other vehicle) and the third object 130 (e.g., the person on the bicycle) from the first time ($t_1$) to the second time ($t_2$) can be perceivable, in the second field of view 120, as an exaggeration of the real relative motion between such objects and the vehicle 102. That is, if such objects are moving in a same direction as the vehicle 102 and at a same speed as the vehicle 102, then such objects can be perceivable, in the second field of view 120, as not being in motion. In contrast, if such objects are moving in a direction that is different from a direction of the vehicle 102, then rates of the changes in the positions of such objects can be perceivable, in the second field of view 120, as greater than the real relative motion between such objects and the vehicle 102.

Figure 4:
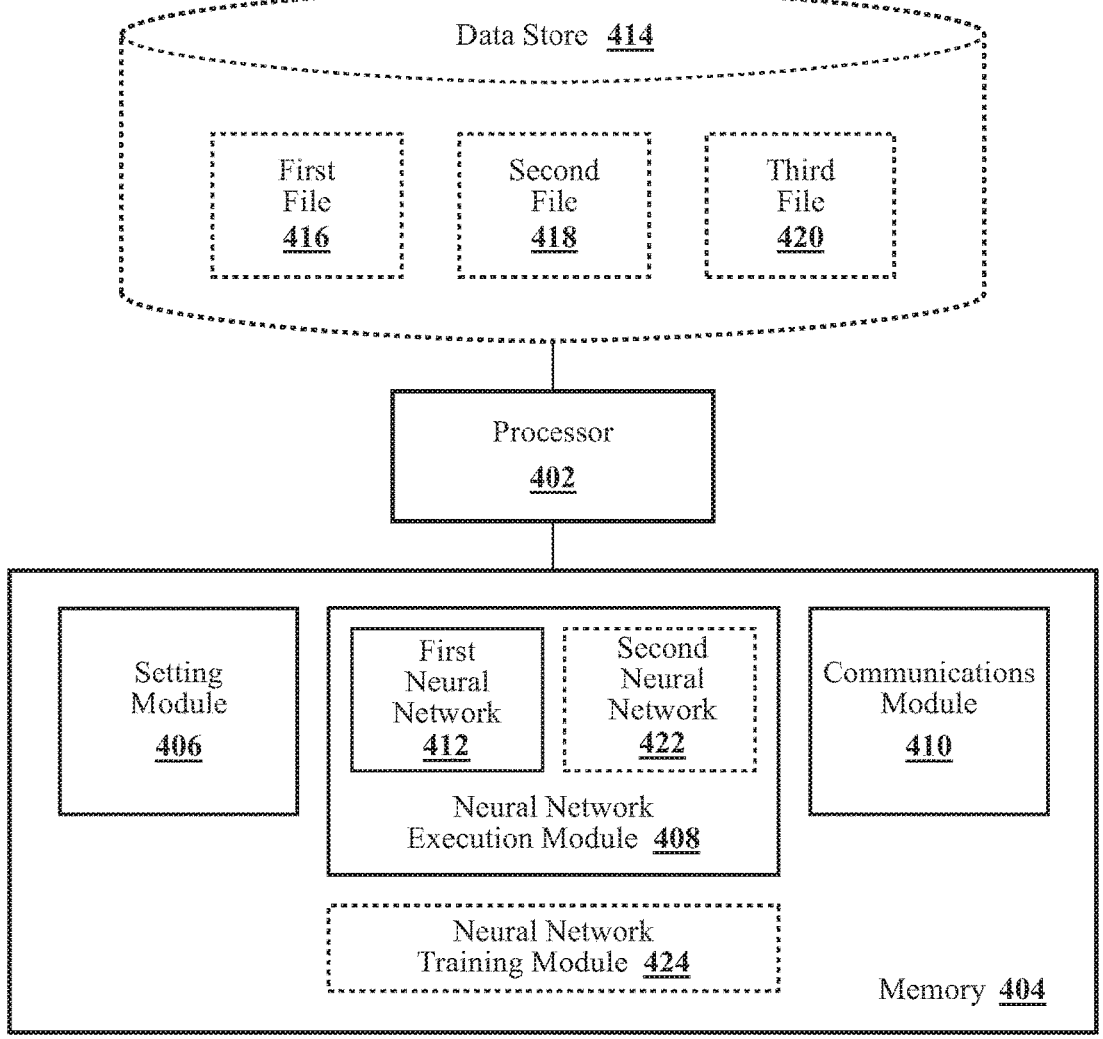

FIG. 4 includes a block diagram that illustrates an example of a system 400 for determining the representation of the spatial structure of the objects in the image, according to the disclosed technologies. The system 400 can include, for example, a processor 402 and a memory 404. The memory 404 can be communicably coupled to the processor 402. The memory 404 can store, for example, a setting module 406, a neural network execution module 408, and a communications module 410. For example, the image can include a two dimensional image. For example, the image can include a monocular image. For example, the image can include a pair of images that comprise a stereo image.

The setting module 406 can include instructions that function to control the processor 402 to set a mode of a first neural network 412 in response to a receipt of the image and a receipt of a facing direction of a camera that produced the image. The mode can account for the facing direction. For example, the image can be the image 202 (illustrated in FIG. 2) and the facing direction of the camera that produced the image can be the forward facing direction of the first camera 110 (illustrated in FIG. 1).

In a first implementation, the system 400 can be disposed in a vehicle. For example, the vehicle can be the vehicle 102 (illustrated in FIG. 1.) In a second implementation, the system 400 can be disposed in a second system that is separate from the vehicle. The second system that is separate from the vehicle can be, for example, the "connected car" cloud platform 138 (illustrated in FIG. 1). In this implementation, the processor 402 can be configured to receive, from the vehicle, the image and the facing direction of the camera that produced the image. In a variation of the first implementation or the second implementation, functions or operations of a portion of the system 400 can be disposed in the vehicle and functions or operations of another portion of the system 400 can be disposed in the second system that is separate from the vehicle.

The facing direction can include one or more of a first facing direction of a first camera disposed on a vehicle or a second facing direction of a second camera disposed on the vehicle. For example, the first facing direction can be a forward facing direction (e.g., the forward facing direction of the first camera 110 illustrated in FIG. 1). For example, the second facing direction can be a facing direction orthogonal to the forward facing direction. For example, the facing direction orthogonal to the forward facing direction can be a left facing direction (e.g., the left facing direction of the second camera 112 illustrated in FIG. 1). In a variation, the facing direction of the camera that produced the image can include one or more of the forward facing direction, the left facing direction, a right facing direction of a third camera disposed on the vehicle (e.g., the right facing direction of the third camera 114 illustrated in FIG. 1), or a rear facing direction of a fourth camera disposed on the vehicle (e.g., the rear facing direction of the fourth camera 116 illustrated in FIG. 1). For example, the first camera, the second camera, the third camera, and the fourth camera can be arranged to produce images throughout a range of 360 degrees. One of skill in the art understands, in light of the description herein, that more or fewer cameras can be disposed on the vehicle and that these cameras can have different facing directions. For example, the different facing directions can be measured in a variety of different ways such as degrees of angles from a point and an axis defined with respect to a position disposed on the vehicle.

Additionally, the system 400 can further include, for example, a data store 414. The data store 414 can be communicably coupled to the processor 402. The data store 414 can store, for example, a first file 416 and a second file 418. Alternatively, content of the first file 416 and the second file 418 can be stored in more or fewer files. The first file 416 can include information that identifies nodes in the first neural network 412, information that identifies inputs of the nodes, and first values of weights to be applied to the inputs. The second file 418 can include the information that identifies the nodes in the first neural network 412, the information that identifies the inputs of the nodes, and second values of the weights to be applied to the inputs. The setting module 406 can include instructions that function to control the processor 402 to apply: (1) the first values of the weights to the inputs of the nodes in response to the facing direction of the camera that produced the image being the first facing direction and (2) the second values of the weights to the inputs of the nodes in response to the facing direction of the camera that produced the image being the second facing direction. For example, the first values of the weights can be for a depth model that reflects characteristics associated with producing images having the first field of view 118 as described above with reference to FIG. 2, and the second values of the weights can be for a depth model that reflects characteristics associated with producing images having the second field of view 120 as described above with reference to FIG. 3.

Advantageously, because different values of the weights can be applied to the same neural network (e.g., the first neural network 412), the system 400 can realize a depth model for a mode based on the first facing direction that is different from a depth model for a mode based on the second facing direction. Advantageously, because the same neural network (e.g., the first neural network 412) can be used in the system 400 for both the mode based on the first facing direction and the mode based on the second facing direction, the system 400 can consume a lesser amount of memory than a system in which each facing direction has a corresponding neural network. Advantageously, because the same neural network (e.g., the first neural network 412) can be used in the system 400 for both the mode based on the first facing direction and the mode based on the second facing direction, the neural network (e.g., the first neural network 412) in the system 400 can be trained in a shorter duration of time than a system in which each facing direction has a corresponding neural network that must be trained individually.

In a variation, the data store 414 can further store a third file 420. Alternatively, content of the first file 416, the second file 418, and the third file 420 can be stored in more or fewer files. The third file 420 can include the information that identifies the nodes in the first neural network 412, the information that identifies the inputs of the nodes, and third values of the weights to be applied to the inputs. The setting module 406 can further include instructions that function to control the processor 402 to apply the third values of the weights to the inputs of the nodes in response to the facing direction of the camera that produced the image being the first facing direction and the second facing direction.

Figure 5:
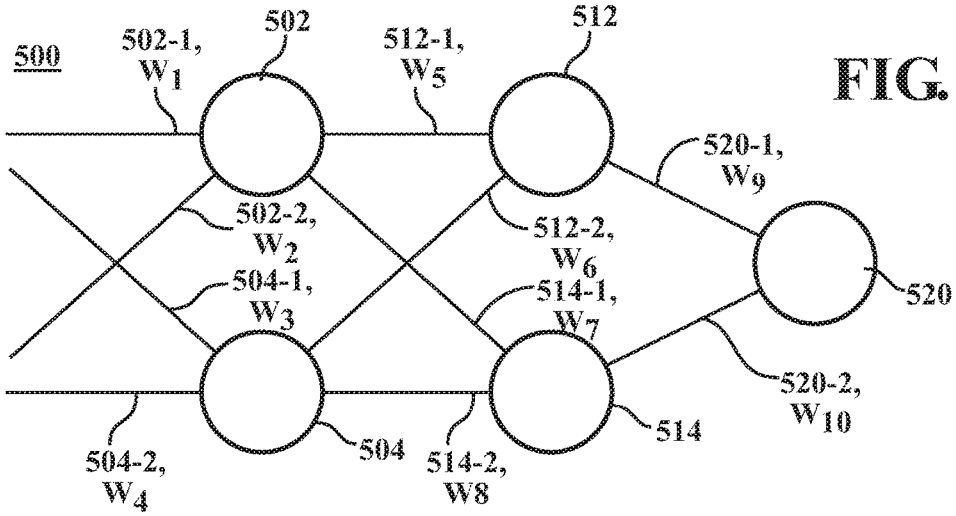
FIG. 5 includes a block diagram that illustrates an example of a neural network.

FIG. 5 includes a block diagram that illustrates an example of a neural network 500. The neural network 500 can include, for example, a first node 502, a second node 504, a third node 512, a fourth node 514, and a fifth node 520. The first node 502 can have, for example, a first input 502-1 and a second input 502-2. A weight $W_1$ can be applied to the first input 502-1. A weight $W_2$ can be applied to the second input 502-2. The second node 504 can have, for example, a first input 504-1 and a second input 504-2. A weight $W_3$ can be applied to the first input 504-1. A weight $W_4$ can be applied to the second input 504-2. The third node 512 can have, for example, a first input 512-1 and a second input 512-2. A weight $W_5$ can be applied to the first input 512-1. A weight $W_6$ can be applied to the second input 512-2. The fourth node 514 can have, for example, a first input 514-1 and a second input 514-2. A weight $W_7$ can be applied to the first input 514-1. A weight $W_8$ can be applied to the second input 514-2. The fifth node 520 can have, for example, a first input 520-1 and a second input 520-2. A weight $W_9$ can be applied to the first input 520-1. A weight $W_{10}$ can be applied to the second input 520-2.

FIG. 6 includes tables that illustrate examples of files of node data, according to the disclosed technologies. A view (a) of FIG. 6 can be an example of the first file 416. A view (b) of FIG. 6 can be an example of the second file 418. A view (c) of FIG. 6 can be an example of the third file 420. Each of the first file 416, the second file 418, and the third file 420 can include, for example, three columns and ten rows. The three columns can include, for example, the information that identifies the nodes 602 in the neural network 500, the information that identifies the inputs 604 of the nodes 602, and the values of weights 606 to be applied to the inputs 604.

Returning to FIG. 4, the neural network execution module 408 can include instructions that function to control the processor 402 to execute, in response to the mode having been set, the first neural network 412 to determine the representation of the spatial structure of the objects in the image (e.g., the depth estimate).

Additionally, the neural network execution module 408 can further include instructions that function to control the processor 402 to execute, in response to the mode having been set, a second neural network 422 to determine a position of an object in the image and an orientation of the object in the image (e.g., a pose estimate). For example, the instructions of the neural network execution module 408 can cause the processor 402 to execute the second neural network 422 and the first neural network 412 concurrently.

The communications module 410 can include instructions that function to control the processor 402 to transmit the representation of the spatial structure of the objects in the image (and the position of the object in the image and the orientation of the object in the image) to an automotive navigation system. For example, the automotive navigation system can be the automotive navigation system 136 (illustrated in FIG. 1.) The automotive navigation system can be configured to use the representation of the spatial structure of the objects in the image (and the position of the object in the image and the orientation of the object in the image) to determine a distance between the vehicle and a specific object in the image. For example, information from the representation of the spatial structure of the objects in the image (and the position of the object in the image and the orientation of the object in the image) can be incorporated into a digital map. The automotive navigation system can use the digital map and information received from a global navigation satellite system (GNNS) to produce a turn-by-turn navigation service.

In the first implementation, in which the system 400 is disposed in the vehicle, the communications module 410 can include instructions that function to control the processor 402 to transmit, within the vehicle, the representation of the spatial structure of the objects in the image (and the position of the object in the image and the orientation of the object in the image) to the automotive navigation system of the vehicle. In the second implementation, in which the system 400 is disposed, for example, in the "connected car" cloud platform 138 (illustrated in FIG. 1), the communications module 410 can include instructions that function to control the processor 402 to transmit, to the vehicle, the representation of the spatial structure of the objects in the image (and the position of the object in the image and the orientation of the object in the image) to the automotive navigation system of the vehicle.

In a variation of the first implementation or the second implementation, the vehicle can be an autonomous vehicle. In this variation, the automotive navigation system can control, via information provided in the digital map, an operation of the autonomous vehicle.

Additionally, the memory 404 can further store a neural network training module 424. The neural network training module 424 can include instructions that function to control the processor 402 to perform a first training operation of the first neural network 412 with respect to a first set of training images associated with the first facing direction. For example, a result of the first training operation can be the first values of the weights (e.g., illustrated in the view (a) of FIG. 6). The neural network training module 424 can further include instructions that function to control the processor 402 to store the first values of the weights in the first file 416.

Additionally, the neural network training module 424 can further include instructions that function to control the processor 402 to perform a second training operation of the first neural network 412 with respect to a second set of training images associated with the second facing direction. For example, a result of the second training operation can be the second values of the weights (e.g., illustrated in the view (b) of FIG. 6). The neural network training module 424 can further include instructions that function to control the processor 402 to store the second values of the weights in the second file 418.

For example, a performance of the second training operation can be independent of a performance of the first training operation.

For example, a performance of the first training operation, the second training operation, or both can be in a self-supervised manner.

Additionally, the neural network training module 424 can further include instructions that function to control the processor 402 to perform a training operation of the second neural network 422. For example, a performance of the training operation can be in a self-supervised manner. For example, the training operation can include two sub-operations. In a first sub-operation, the second neural network 422 can be trained with respect to a set of training images associated with the first facing direction to determine the position of the object in the image with respect to the first facing direction and the orientation of the object in the image with respect to the first facing direction. For example, the first facing direction can be a forward facing direction. In a second sub-operation, the position of the object in the image with respect to the second facing direction and the orientation of the object in the image with respect to the second facing direction can be determined based on the first facing direction, the second facing direction, the position of the object in the image with respect to the first facing direction, and the orientation of the object in the image with respect to the first facing direction. For example, the first facing direction can be associated with a position on the vehicle of the first camera (e.g., the position on the vehicle 102 of the first camera 110 illustrated in FIG. 1) and the second facing direction can be associated with a position on the vehicle of the second camera (e.g., the position on the vehicle 102 of the second camera 112 illustrated in FIG. 1). In this manner, for example, the second neural network 422 can be trained to produce a pose estimate with respect to one camera and then use the position on the vehicle of the one camera and the position on the vehicle of another camera to determine a pose estimate with respect to the other camera.

Figure 7:
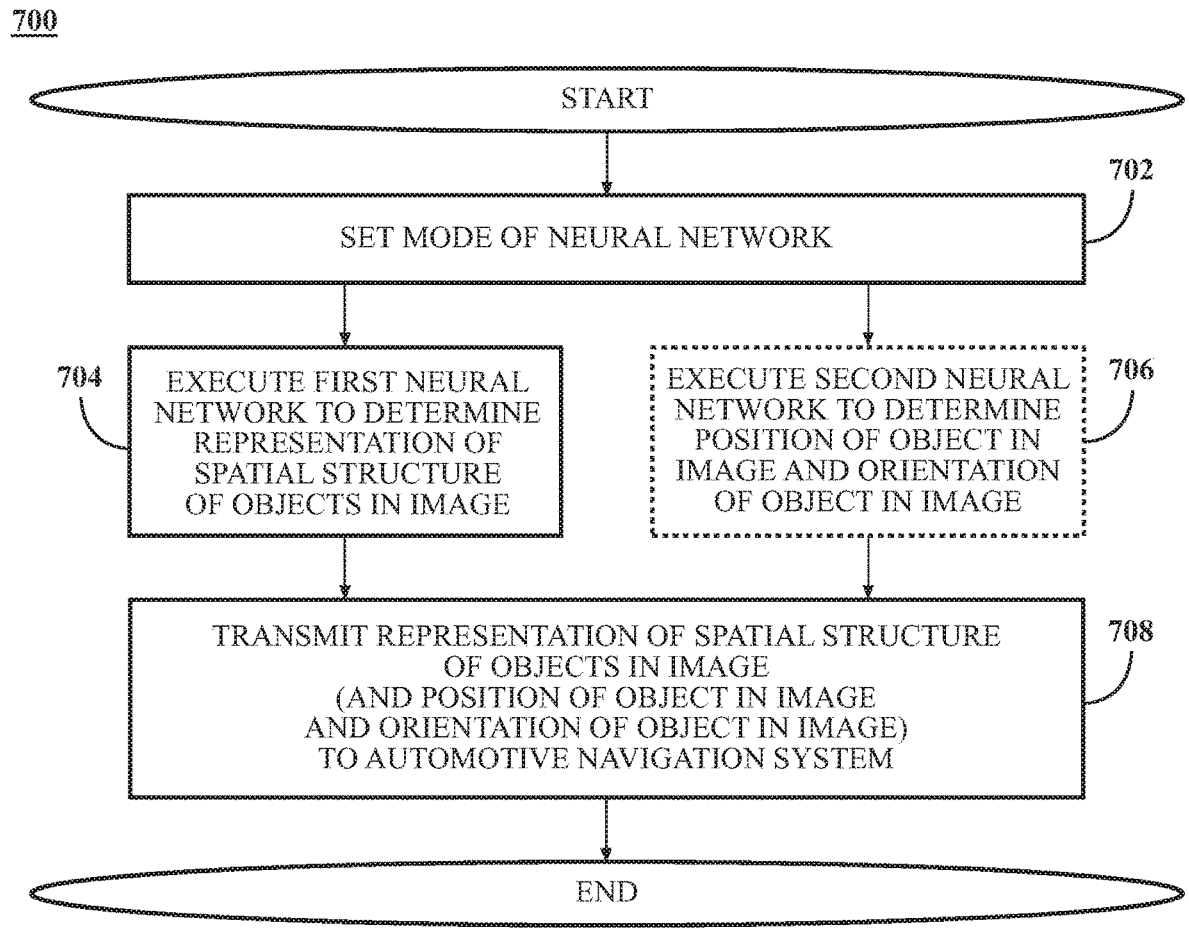
FIG. 7 includes a flow diagram that illustrates an example of a method that is associated with determining the representation of the spatial structure of the objects in the image, according to the disclosed technologies.

FIG. 7 includes a flow diagram that illustrates an example of a method 700 that is associated with determining the representation of the spatial structure of the objects in an image, according to the disclosed technologies. The method 700 is described from the perspective of the system 400 illustrated in FIG. 4. Although the method 700 is described in combination with the system 400, one of skill in the art understands, in light of the description herein, that the method 700 is not limited to being implemented by the system 400. Rather, the system 400 is an example of a system that may be used to implement the method 700. For example, the image can include a two dimensional image. For example, the image can include a monocular image. For example, the image can include a pair of images that comprise a stereo image.

In FIG. 7, in the method 700, at an operation 702, the processor 402 can set a mode of the first neural network 412 in response to a receipt of the image and a receipt of a facing direction of a camera that produced the image. The mode can account for the facing direction.

In the first implementation, the processor 402 can be disposed in a vehicle. For example, the vehicle can be the vehicle 102 (illustrated in FIG. 1). In the second implementation, the processor 402 can be disposed in a second system that is separate from the vehicle. The second system that is separate from the vehicle can be, for example, the "connected car" cloud platform 138 (illustrated in FIG. 1). In this implementation, the processor 402 can be configured to receive, from the vehicle, the image and the facing direction of the camera that produced the image. In a variation of the first implementation or the second implementation, functions or operations of a portion of the processor 402 can be disposed in the vehicle and functions or operations of another portion of the processor 402 can be disposed in the second system that is separate from the vehicle.

The facing direction can include one or more of a first facing direction of a first camera disposed on a vehicle or a second facing direction of a second camera disposed on the vehicle. For example, the first facing direction can be a forward facing direction (e.g., the forward facing direction of the first camera 110 illustrated in FIG. 1). For example, the second facing direction can be a facing direction orthogonal to the forward facing direction. For example, the facing direction orthogonal to the forward facing direction can be a left facing direction (e.g., the left facing direction of the second camera 112 illustrated in FIG. 1). In a variation, the facing direction of the camera that produced the image can include one or more of the forward facing direction, the left facing direction, a right facing direction of a third camera disposed on the vehicle (e.g., the right facing direction of the third camera 114 illustrated in FIG. 1), or a rear facing direction of a fourth camera disposed on the vehicle (e.g., the rear facing direction of the fourth camera 116 illustrated in FIG. 1). For example, the first camera, the second camera, the third camera, and the fourth camera can be arranged to produce images throughout a range of 360 degrees. One of skill in the art understands, in light of the description herein, that more or fewer cameras can be disposed on the vehicle and that these cameras can have different facing directions. For example, the different facing directions can be measured in a variety of different ways such as degrees of angles from a point and an axis defined with respect to a position disposed on the vehicle.

For example, the operation 702 can include at least two sub-operations. In a first sub-operation, in response to the facing direction of the camera that produced the image being the first facing direction, the first values of weights can be applied to inputs of nodes of the first neural network 412. In a second sub-operation, in response to the facing direction of the camera that produced the image being the second facing direction, the second values of the weights can be applied to the inputs of the nodes of the first neural network 412. The first file 416 can include the information that identifies the nodes in the first neural network 412, the information that identifies the inputs of the nodes, and the first values of the weights to be applied to the inputs. The second file 418 can include the information that identifies the nodes in the first neural network 412, the information that identifies the inputs of the nodes, and the second values of the weights to be applied to the inputs. Alternatively, content of the first file 416 and the second file 418 can be stored in more or fewer files.

In a variation, the operation 702 can include a third sub-operation. In the third sub-operation, in response to the facing direction of the camera that produced the image being the first facing direction and the second facing direction, the third values of the weights can be applied to the inputs of the nodes of the first neural network 412. The third file 420 can include the information that identifies the nodes in the first neural network 412, the information that identifies the inputs of the nodes, and the third values of the weights to be applied to the inputs. Alternatively, content of the first file 416, the second file 418, and the third file 420 can be stored in more or fewer files.

At an operation 704, the processor 402 can execute, in response to the mode having been set, the first neural network 412 to determine the representation of the spatial structure of the objects in the image (e.g., the depth estimate).

Additionally, at an operation 706, the processor 402 can execute, in response to the mode having been set, the second neural network 422 to determine a position of an object in the image and an orientation of the object in the image (e.g., the pose estimate). For example, the processor 402 can execute the second neural network 422 and the first neural network 412 concurrently.

At an operation 708, the processor 402 can transmit the representation of the spatial structure of the objects in the image (and the position of the object in the image and the orientation of the object in the image) to an automotive navigation system. For example, the automotive navigation system can be the automotive navigation system 136 (illustrated in FIG. 1.) The automotive navigation system can be configured to use the representation of the spatial structure of the objects in the image (and the position of the object in the image and the orientation of the object in the image) to determine a distance between the vehicle and a specific object in the image. For example, information from the representation of the spatial structure of the objects in the image (and the position of the object in the image and the orientation of the object in the image) can be incorporated into a digital map. The automotive navigation system can use the digital map and information received from a global navigation satellite system (GNNS) to produce a turn-by-turn navigation service.

In the first implementation, in which the processor 402 is disposed in the vehicle, the processor 402 can transmit, within the vehicle, the representation of the spatial structure of the objects in the image (and the position of the object in the image and the orientation of the object in the image) to the automotive navigation system of the vehicle. In the second implementation, in which the processor 402 is disposed, for example, in the "connected car" cloud platform 138 (illustrated in FIG. 1), the processor 402 can transmit, to the vehicle, the representation of the spatial structure of the objects in the image (and the position of the object in the image and the orientation of the object in the image) to the automotive navigation system of the vehicle.

In a variation of the first implementation or the second implementation, the vehicle can be an autonomous vehicle. In this variation, the automotive navigation system can control, via information provided in the digital map, an operation of the autonomous vehicle.

Figure 8:
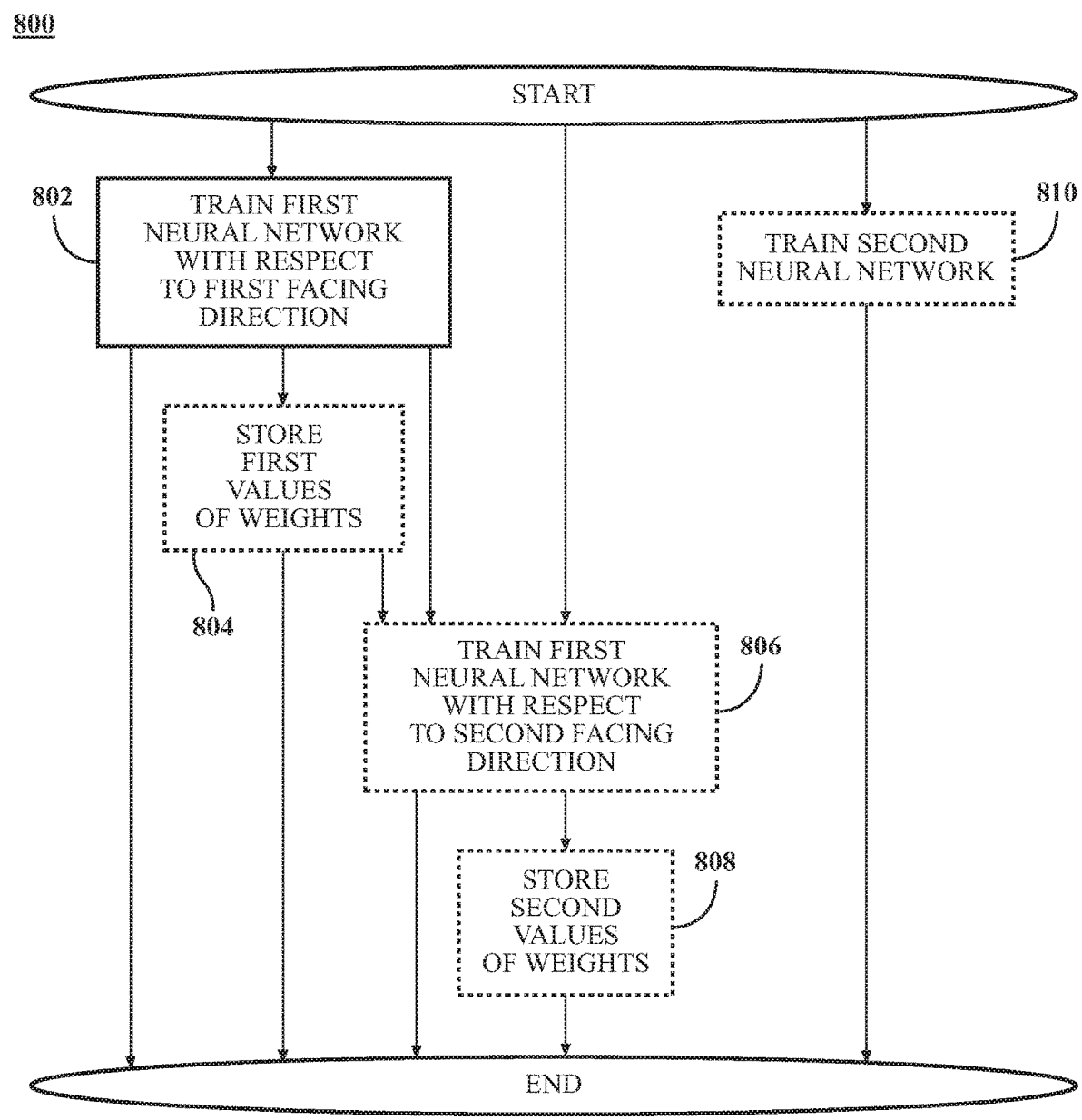
FIG. 8 includes a flow diagram that illustrates an example of a method that is associated with training one or more neural networks, according to the disclosed technologies.

FIG. 8 includes a flow diagram that illustrates an example of a method 800 that is associated with training one or more neural networks, according to the disclosed technologies. The method 800 is described from the perspective of the system 400 illustrated in FIG. 4. Although the method 800 is described in combination with the system 400, one of skill in the art understands, in light of the description herein, that the method 800 is not limited to being implemented by the system 400. Rather, the system 400 is an example of a system that may be used to implement the method 800.

In FIG. 8, in the method 800, at an operation 802, the processor 402 can perform a first training operation of the first neural network 412 with respect to a first set of training images associated with the first facing direction. For example, a result of the first training operation can be the first values of the weights (e.g., illustrated in the view (a) of FIG. 6).

Additionally, at an operation 804, the processor 402 can store the first values of the weights in the first file 416.

Additionally, at an operation 806, the processor 402 can perform a second training operation of the first neural network 412 with respect to a second set of training images associated with the second facing direction. For example, a result of the second training operation can be the second values of the weights (e.g., illustrated in the view (b) of FIG. 6).

Additionally, at an operation 808, the processor 402 can store the second values of the weights in the second file 418.

For example, a performance of the second training operation can be independent of a performance of the first training operation.

For example, a performance of the first training operation, the second training operation, or both can be in a self-supervised manner.

Additionally, at an operation 810, the processor 402 can perform a training operation of the second neural network 422. For example, a performance of the training operation can be in a self-supervised manner. For example, the operation 810 can include at least two sub-operations. In a first sub-operation, the second neural network 422 can be trained with respect to a set of training images associated with the first facing direction to determine the position of the object in the image with respect to the first facing direction and the orientation of the object in the image with respect to the first facing direction. For example, the first facing direction can be a forward facing direction. In a second sub-operation, the position of the object in the image with respect to the second facing direction and the orientation of the object in the image with respect to the second facing direction can be determined based on the first facing direction, the second facing direction, the position of the object in the image with respect to the first facing direction, and the orientation of the object in the image with respect to the first facing direction. For example, the first facing direction can be associated with a position on the vehicle of the first camera (e.g., the position on the vehicle 102 of the first camera 110 illustrated in FIG. 1) and the second facing direction can be associated with a position on the vehicle of the second camera (e.g., the position on the vehicle 102 of the second camera 112 illustrated in FIG. 1). In this manner, for example, the second neural network 422 can be trained to produce a pose estimate with respect to one camera and then use the position on the vehicle of the one camera and the position on the vehicle of another camera to determine a pose estimate with respect to the other camera.

Figure 9:
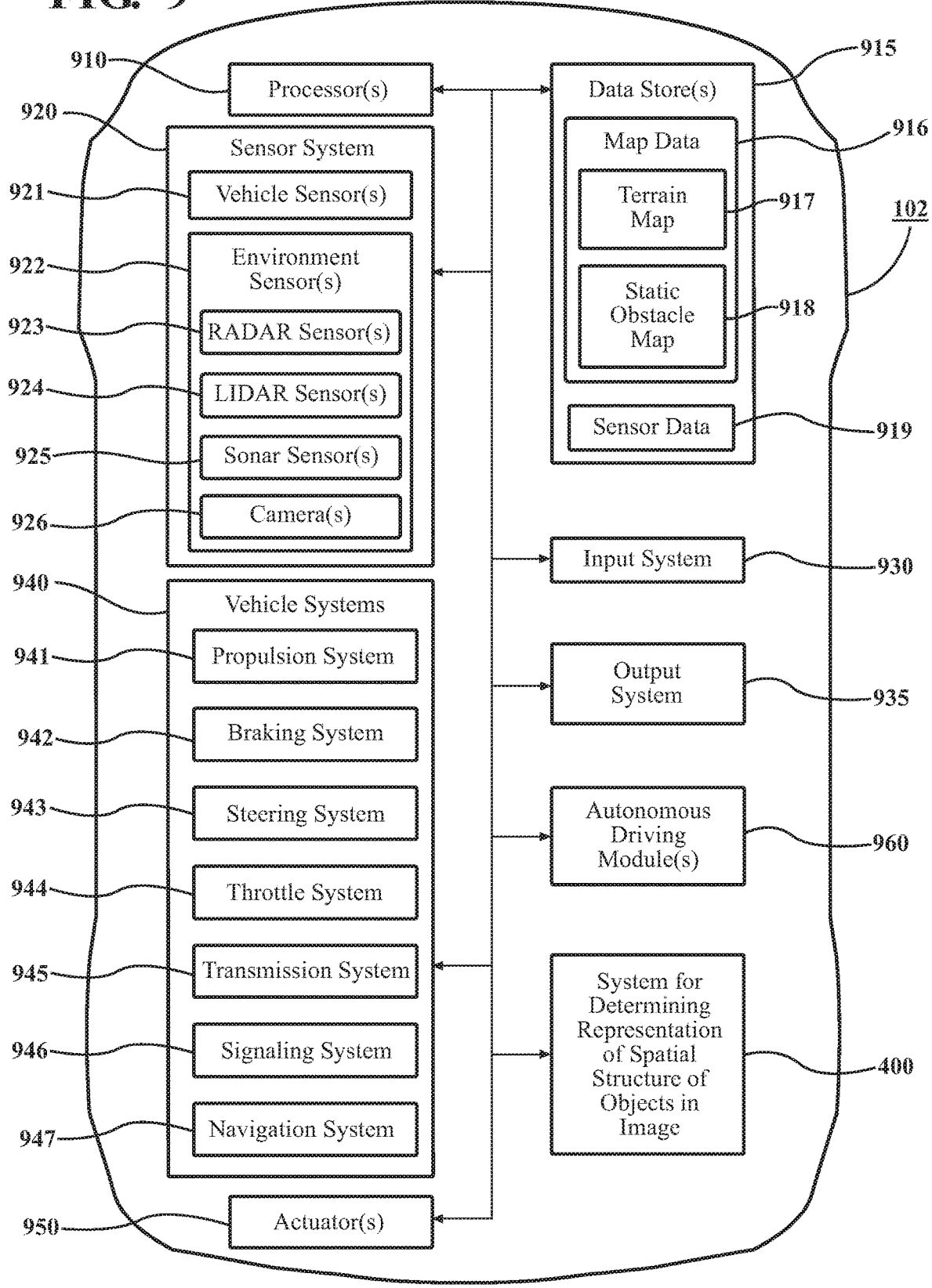
FIG. 9 includes a block diagram that illustrates an example of elements disposed on a vehicle, according to the disclosed technologies.

FIG. 9 includes a block diagram that illustrates an example of elements disposed on the vehicle 102, according to the disclosed technologies. As used herein, a "vehicle" can be any form of powered transport. In one or more implementations, the vehicle 102 can be an automobile. While arrangements described herein are with respect to automobiles, one of skill in the art understands, in light of the description herein, that embodiments are not limited to automobiles.

In some embodiments, the vehicle 102 can be configured to switch selectively between an autonomous mode, one or more semi-autonomous operational modes, and/or a manual mode. Such switching can be implemented in a suitable manner, now known or later developed. As used herein, "manual mode" can refer that all of or a majority of the navigation and/or maneuvering of the vehicle 102 is performed according to inputs received from a user (e.g., human driver). In one or more arrangements, the vehicle 102 can be a conventional vehicle that is configured to operate in only a manual mode.

In one or more embodiments, the vehicle 102 can be an autonomous vehicle. As used herein, "autonomous vehicle" can refer to a vehicle that operates in an autonomous mode. As used herein, "autonomous mode" can refer to navigating and/or maneuvering the vehicle 102 along a travel route using one or more computing systems to control the vehicle 102 with minimal or no input from a human driver. In one or more embodiments, the vehicle 102 can be highly automated or completely automated. In one embodiment, the vehicle 102 can be configured with one or more semi-autonomous operational modes in which one or more computing systems perform a portion of the navigation and/or maneuvering of the vehicle along a travel route, and a vehicle operator (i.e., driver) provides inputs to the vehicle 102 to perform a portion of the navigation and/or maneuvering of the vehicle 102 along a travel route.

The vehicle 102 can include various elements. The vehicle 102 can have any combination of the various elements illustrated in FIG. 9. In various embodiments, it may not be necessary for the vehicle 102 to include all of the elements illustrated in FIG. 9. Furthermore, the vehicle 102 can have elements in addition to those illustrated in FIG. 9. While the various elements are illustrated in FIG. 9 as being located within the vehicle 102, one or more of these elements can be located external to the vehicle 102. Furthermore, the elements illustrated may be physically separated by large distances. For example, as described, one or more components of the disclosed system can be implemented within the vehicle 102 while other components of the system can be implemented within a cloud-computing environment, as described below. For example, the elements can include one or more processors 910, one or more data stores 915, a sensor system 920, an input system 930, an output system 935, vehicle systems 940, one or more actuators 950, one or more autonomous driving modules 960, and the system 400 for determining the representation of the spatial arrangement of the objects in an image.

In one or more arrangements, the one or more processors 910 can be a main processor of the vehicle 102. For example, the one or more processors 910 can be an electronic control unit (ECU). For example, functions and/or operations of the processor 402 (illustrated in FIG. 4) can be realized by the one or more processors 910.

The one or more data stores 915 can store, for example, one or more types of data. For example, functions and/or operations of the memory 404 and/or the data store 414 (illustrated in FIG. 4) can be realized by the one or more data stores 915. The one or more data store 915 can include volatile memory and/or non-volatile memory. Examples of suitable memory for the one or more data stores 915 can include Random-Access Memory (RAM), flash memory, Read-Only Memory (ROM), Programmable Read-Only Memory (PROM), Erasable Programmable Read-Only Memory (EPROM), Electrically Erasable Programmable Read-Only Memory (EEPROM), registers, magnetic disks, optical disks, hard drives, any other suitable storage medium, or any combination thereof. The one or more data stores 915 can be a component of the one or more processors 910. Additionally or alternatively, the one or more data stores 915 can be operatively connected to the one or more processors 910 for use thereby. As used herein, "operatively connected" can include direct or indirect connections, including connections without direct physical contact. As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

In one or more arrangements, the one or more data stores 915 can store map data 916. The map data 916 can include maps of one or more geographic areas. In some instances, the map data 916 can include information or data on roads, traffic control devices, road markings, structures, features, and/or landmarks in the one or more geographic areas. The map data 916 can be in any suitable form. In some instances, the map data 916 can include aerial views of an area. In some instances, the map data 916 can include ground views of an area, including 360-degree ground views. The map data 916 can include measurements, dimensions, distances, and/or information for one or more items included in the map data 916 and/or relative to other items included in the map data 916. The map data 916 can include a digital map with information about road geometry. The map data 916 can be high quality and/or highly detailed.

In one or more arrangements, the map data 916 can include one or more terrain maps 917. The one or more terrain maps 917 can include information about the ground, terrain, roads, surfaces, and/or other features of one or more geographic areas. The one or more terrain maps 917 can include elevation data of the one or more geographic areas. The map data 916 can be high quality and/or highly detailed. The one or more terrain maps 917 can define one or more ground surfaces, which can include paved roads, unpaved roads, land, and other things that define a ground surface.

In one or more arrangements, the map data 916 can include one or more static obstacle maps 918. The one or more static obstacle maps 918 can include information about one or more static obstacles located within one or more geographic areas. A "static obstacle" can be a physical object whose position does not change (or does not substantially change) over a period of time and/or whose size does not change (or does not substantially change) over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the one or more static obstacle maps 918 can have location data, size data, dimension data, material data, and/or other data associated with them. The one or more static obstacle maps 918 can include measurements, dimensions, distances, and/or information for one or more static obstacles. The one or more static obstacle maps 918 can be high quality and/or highly detailed. The one or more static obstacle maps 918 can be updated to reflect changes within a mapped area.

In one or more arrangements, the one or more data stores 915 can store sensor data 919. As used herein, "sensor data" can refer to any information about the sensors with which the vehicle 102 can be equipped including the capabilities of and other information about such sensors. The sensor data 919 can relate to one or more sensors of the sensor system 920. For example, in one or more arrangements, the sensor data 919 can include information about one or more LIDAR sensors 924 of the sensor system 920.

In some arrangements, at least a portion of the map data 916 and/or the sensor data 919 can be located in one or more data stores 915 that are located onboard the vehicle 102. Alternatively or additionally, at least a portion of the map data 916 and/or the sensor data 919 can be located in one or more data stores 915 that are located remotely from the vehicle 102.

The sensor system 920 can include one or more sensors. As used herein, a "sensor" can refer to any device, component, and/or system that can detect and/or sense something. The one or more sensors can be configured to detect and/or sense in real-time. As used herein, the term "real-time" can refer to a level of processing responsiveness that is perceived by a user or system to be sufficiently immediate for a particular process or determination to be made, or that enables the processor to keep pace with some external process.

In arrangements in which the sensor system 920 includes a plurality of sensors, the sensors can work independently from each other. Alternatively, two or more of the sensors can work in combination with each other. In such a case, the two or more sensors can form a sensor network. The sensor system 920 and/or the one or more sensors can be operatively connected to the one or more processors 910, the one or more data stores 915, and/or another element of the vehicle 102 (including any of the elements illustrated in FIG. 9). The sensor system 920 can acquire data of at least a portion of the external environment of the vehicle 102 (e.g., nearby vehicles). The sensor system 920 can include any suitable type of sensor. Various examples of different types of sensors are described herein. However, one of skill in the art understands that the embodiments are not limited to the particular sensors described herein.

The sensor system 920 can include one or more vehicle sensors 921. The one or more vehicle sensors 921 can detect, determine, and/or sense information about the vehicle 102 itself. In one or more arrangements, the one or more vehicle sensors 921 can be configured to detect and/or sense position and orientation changes of the vehicle 102 such as, for example, based on inertial acceleration. In one or more arrangements, the one or more vehicle sensors 921 can include one or more accelerometers, one or more gyroscopes, an inertial measurement unit (IMU), a dead-reckoning system, a global navigation satellite system (GNSS), a global positioning system (GPS), a navigation system 947, and/or other suitable sensors. The one or more vehicle sensors 921 can be configured to detect and/or sense one or more characteristics of the vehicle 102. In one or more arrangements, the one or more vehicle sensors 921 can include a speedometer to determine a current speed of the vehicle 102.

Alternatively or additionally, the sensor system 920 can include one or more environment sensors 922 configured to acquire and/or sense driving environment data. As used herein, "driving environment data" can include data or information about the external environment in which a vehicle is located or one or more portions thereof. For example, the one or more environment sensors 922 can be configured to detect, quantify, and/or sense obstacles in at least a portion of the external environment of the vehicle 102 and/or information/data about such obstacles. Such obstacles may be stationary objects and/or dynamic objects. The one or more environment sensors 922 can be configured to detect, measure, quantify, and/or sense other things in the external environment of the vehicle 102 such as, for example, lane markers, signs, traffic lights, traffic signs, lane lines, crosswalks, curbs proximate the vehicle 102, off-road objects, etc.

Various examples of sensors of the sensor system 920 are described herein. The example sensors may be part of the one or more vehicle sensors 921 and/or the one or more environment sensors 922. However, one of skill in the art understands that the embodiments are not limited to the particular sensors described.

In one or more arrangement, the one or more environment sensors 922 can include one or more radar sensors 923, one or more LIDAR sensors 924, one or more sonar sensors 925, and/or one more cameras 926. In one or more arrangements, the one or more cameras 926 can be one or more high dynamic range (HDR) cameras or one or more infrared (IR) cameras. For example, the one or more cameras 926 can be used to record a reality of a state of an item of information that can appear in digital map.

The input system 930 can include any device, component, system, element, arrangement, or groups thereof that enable information/data to be entered into a machine. The input system 930 can receive an input from a vehicle passenger (e.g., a driver or a passenger). The output system 935 can include any device, component, system, element, arrangement, or groups thereof that enable information/data to be presented to a vehicle passenger (e.g., a driver or a passenger).

Various examples of the one or more vehicle systems 940 are illustrated in FIG. 9. However, one of skill in the art understands that the vehicle 102 can include more, fewer, or different vehicle systems. Although particular vehicle systems can be separately defined, each or any of the systems or portions thereof may be otherwise combined or segregated via hardware and/or software within the vehicle 102. For example, the one or more vehicle systems 940 can include a propulsion system 941, a braking system 942, a steering system 943, a throttle system 944, a transmission system 945, a signaling system 946, and/or the navigation system 947. Each of these systems can include one or more devices, components, and/or a combination thereof, now known or later developed.

The navigation system 947 can include one or more devices, applications, and/or combinations thereof, now known or later developed, configured to determine the geographic location of the vehicle 102 and/or to determine a travel route for the vehicle 102. The navigation system 947 can include one or more mapping applications to determine a travel route for the vehicle 102. The navigation system 947 can include a global positioning system, a local positioning system, a geolocation system, and/or a combination thereof. For example, functions and/or operations of the automotive navigation system 136 (illustrated in FIG. 1) can be realized by the navigation system 947.

The one or more actuators 950 can be any element or combination of elements operable to modify, adjust, and/or alter one or more of the vehicle systems 940 or components thereof responsive to receiving signals or other inputs from the one or more processors 910 and/or the one or more autonomous driving modules 960. Any suitable actuator can be used. For example, the one or more actuators 950 can include motors, pneumatic actuators, hydraulic pistons, relays, solenoids, and/or piezoelectric actuators.

The one or more processors 910 and/or the one or more autonomous driving modules 960 can be operatively connected to communicate with the various vehicle systems 940 and/or individual components thereof. For example, the one or more processors 910 and/or the one or more autonomous driving modules 960 can be in communication to send and/or receive information from the various vehicle systems 940 to control the movement, speed, maneuvering, heading, direction, etc. of the vehicle 102. The one or more processors 910 and/or the one or more autonomous driving modules 960 may control some or all of these vehicle systems 940 and, thus, may be partially or fully autonomous.

The one or more processors 910 and/or the one or more autonomous driving modules 960 may be operable to control the navigation and/or maneuvering of the vehicle 102 by controlling one or more of the vehicle systems 940 and/or components thereof. For example, when operating in an autonomous mode, the one or more processors 910 and/or the one or more autonomous driving modules 960 can control the direction and/or speed of the vehicle 102. The one or more processors 910 and/or the one or more autonomous driving modules 960 can cause the vehicle 102 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" can mean to make, force, compel, direct, command, instruct, and/or enable an event or action to occur or at least be in a state where such event or action may occur, either in a direct or indirect manner.

The vehicle 102 can include one or more modules, at least some of which are described herein. The modules can be implemented as computer-readable program code that, when executed by the one or more processors 910, implement one or more of the various processes described herein. One or more of the modules can be a component of the one or more processors 910. Alternatively or additionally, one or more of the modules can be executed on and/or distributed among other processing systems to which the one or more processors 910 can be operatively connected. The modules can include instructions (e.g., program logic) executable by the one or more processors 910. Alternatively or additionally, the one or more data store 915 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 102 can include one or more autonomous driving modules 960. The one or more autonomous driving modules 960 can be configured to receive data from the sensor system 920 and/or any other type of system capable of capturing information relating to the vehicle 102 and/or the external environment of the vehicle 102. In one or more arrangements, the one or more autonomous driving modules 960 can use such data to generate one or more driving scene models. The one or more autonomous driving modules 960 can determine position and velocity of the vehicle 102. The one or more autonomous driving modules 960 can determine the location of obstacles, obstacles, or other environmental features including traffic signs, trees, shrubs, neighboring vehicles, pedestrians, etc.

The one or more autonomous driving modules 960 can be configured to receive and/or determine location information for obstacles within the external environment of the vehicle 102 for use by the one or more processors 910 and/or one or more of the modules described herein to estimate position and orientation of the vehicle 102, vehicle position in global coordinates based on signals from a plurality of satellites, or any other data and/or signals that could be used to determine the current state of the vehicle 102 or determine the position of the vehicle 102 with respect to its environment for use in either creating a map or determining the position of the vehicle 102 in respect to map data.

The one or more autonomous driving modules 960 can be configured to determine one or more travel paths, current autonomous driving maneuvers for the vehicle 102, future autonomous driving maneuvers and/or modifications to current autonomous driving maneuvers based on data acquired by the sensor system 920, driving scene models, and/or data from any other suitable source such as determinations from the sensor data 919. As used herein, "driving maneuver" can refer to one or more actions that affect the movement of a vehicle. Examples of driving maneuvers include: accelerating, decelerating, braking, turning, moving in a lateral direction of the vehicle 102, changing travel lanes, merging into a travel lane, and/or reversing, just to name a few possibilities. The one or more autonomous driving modules 960 can be configured to implement determined driving maneuvers. The one or more autonomous driving modules 960 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The one or more autonomous driving modules 960 can be configured to execute various vehicle functions and/or to transmit data to, receive data from, interact with, and/or control the vehicle 102 or one or more systems thereof (e.g., one or more of vehicle systems 940). For example, functions and/or operations of an automotive navigation system can be realized by the one or more autonomous driving modules 960.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 1-4 and 6-9, but the embodiments are not limited to the illustrated structure or application.

The flowchart and block diagrams in the figures illustrate the architecture, functionality, and operation of possible implementations of systems, methods, and computer program products according to various embodiments. In this regard, each block in flowcharts or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a random-access memory (RAM), a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . or . . . " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for determining a representation of a spatial structure of objects in an image, the system comprising:
one or more processors; and
a memory communicably coupled to the one or more processors and storing:
a setting module including instructions that when executed by the one or more processors cause the one or more processors to set values of weights to be applied to inputs of nodes of a first neural network and thereby determine a mode of the first neural network in response to a receipt of the image and a receipt of a facing direction of a camera that produced the image, wherein the mode accounts for the facing direction, the facing direction comprises at least one of a first facing direction of a first camera disposed on a vehicle and a second facing direction of a second camera disposed on the vehicle, wherein:
first values of the weights are applied to the inputs of the nodes in response to the facing direction of the camera that produced the image being the first facing direction, and second values of the weights are applied to the inputs of the nodes in response to the facing direction of the camera that produced the image being the second facing direction;
a neural network execution module including instructions that when executed by the one or more processors cause the one or more processors to determine, in response to the mode having been set and via the first neural network network, the representation of the spatial structure of the objects in the image; and
a communications module including instructions that when executed by the one or more processors cause the one or more processors to transmit the representation of the spatial structure of the objects in the image to an automotive navigation system, wherein the automotive navigation system is configured to use the representation of the spatial structure of the objects in the image to determine a distance between the vehicle and a specific object in the image.

2. The system of claim 1, wherein the system is disposed on the vehicle.

3. The system of claim 1, wherein:
the first facing direction is a forward facing direction, and the second facing direction is a facing direction orthogonal to the forward facing direction.

4. The system of claim 3, wherein:
the facing direction orthogonal to the forward facing direction is a left facing direction, and
the facing direction of the camera that produced the image comprises at least one of the forward facing direction, the left facing direction, a right facing direction of a third camera disposed on the vehicle, or a rear facing direction of a fourth camera disposed on the vehicle.

5. The system of claim 1, further comprising a data store communicably coupled to the one or more processors and storing a first file and a second file, wherein:
the first file includes information that identifies the nodes in the first neural network, information that identifies the inputs of the nodes, and the first values of the weights to be applied to the inputs, and
the second file includes the information that identifies the nodes in the first neural network, the information that identifies the inputs of the nodes, and the second values of the weights to be applied to the inputs.

6. The system of claim 5, wherein the data store further stores a third file, wherein:
the third file includes the information that identifies the nodes in the first neural network, the information that identifies the inputs of the nodes, and third values of the weights to be applied to the inputs, and
the instructions of the setting module further cause the one or more processors to apply the third values of the weights to the inputs of the nodes in response to the facing direction of the camera that produced the image being the first facing direction and the second facing direction.

7. The system of claim 1, wherein the memory further stores a neural network training module including instructions that when executed by the one or more processors cause the one or more processors to perform a first training operation of the first neural network with respect to a first set of training images associated with the first facing direction.

8. The system of claim 7, further comprising a data store communicably coupled to the one or more processors and storing a first file, wherein:
the first file includes information that identifies the nodes in the first neural network, information that identifies the inputs of the nodes, and the first values of the weights to be applied to the inputs,
a result of the first training operation is the first values of the weights, and
the neural network training module further includes instructions that when executed by the one or more processors cause the one or more processors to store the first values of the weights in the first file.

9. The system of claim 8, wherein the neural network training module further includes instructions that when executed by the one or more processors cause the one or more processors to perform a second training operation of the first neural network with respect to a second set of training images associated with the second facing direction.

10. The system of claim 9, wherein:
the data store further stores a second file,
the second file includes the information that identifies the nodes in the first neural network, the information that identifies the inputs of the nodes, and second values of the weights to be applied to the inputs,
a result of the second training operation is the second values of the weights, and the instructions of the neural network training module further cause the one or more processors to store the second values of the weights in the second file.

11. The system of claim 10, wherein a performance of the second training operation is independent of a performance of the first training operation.

12. The system of claim 1, wherein the neural network execution module further includes instructions that when executed by the one or more processors cause the one or more processors to determine, in response to the mode having been set and via a second neural network, a position of an object in the image and an orientation of the object in the image.

13. The system of claim 12, wherein the instructions of the neural network execution module cause the one or more processors to execute the second neural network and the first neural network concurrently.

14. The system of claim 12, wherein the memory further stores a neural network training module including instructions that when executed by the one or more processors cause the one or more processors to perform a training operation of the second neural network.

15. The system of claim 14, wherein the training operation comprises:
training the second neural network, with respect to a set of training images associated with the first facing direction, to determine the position of the object in the image with respect to the first facing direction and the orientation of the object in the image with respect to the first facing direction; and
determining the position of the object in the image with respect to the second facing direction and the orientation of the object in the image with respect to the second facing direction based on the first facing direction, the second facing direction, the position of the object in the image with respect to the first facing direction, and the orientation of the object in the image with respect to the first facing direction.

16. The system of claim 15, wherein the first facing direction is a forward facing direction.

17. A method for determining a representation of a spatial structure of objects in an image, the method comprising:
setting, by a processor, values of weights to be applied to inputs of nodes of a neural network and thereby determine a mode of the neural network in response to a receipt of the image and a receipt of a facing direction of a camera that produced the image, wherein the mode accounts for the facing direction, the facing direction comprises at least one of a first facing direction of a first camera disposed on a vehicle and a second facing direction of a second camera disposed on the vehicle, wherein:
  first values of the weights are applied to the inputs of the nodes in response to the facing direction of the camera that produced the image being the first facing direction, and
  second values of the weights are applied to the inputs of the nodes in response to the facing direction of the camera that produced the image being the second facing direction;
determining, by the processor and in response to the mode having been set and via the neural network, the representation of the spatial structure of the objects in the image; and
transmitting, by the processor, the representation of the spatial structure of the objects in the image to an automotive navigation system, wherein the automotive navigation system is configured to use the representation of the spatial structure of the objects in the image to determine a distance between the vehicle and a specific object in the image.

18. The method of claim 17, wherein the vehicle comprises an autonomous vehicle.

19. The method of claim 17, wherein the image comprises a two dimensional image.

20. A non-transitory computer-readable medium for determining a representation of a spatial structure of objects in an image, the non-transitory computer-readable medium including instructions that when executed by one or more processors cause the one or more processors to:
  set values of weights to be applied to inputs of nodes of a neural network and thereby determine a mode of the neural network in response to a receipt of the image and a receipt of a facing direction of a camera that produced the image, wherein the mode accounts for the facing direction, the facing direction comprises at least one of a first facing direction of a first camera disposed on a vehicle or a second facing direction of a second camera disposed on the vehicle, wherein:
    first values of the weights are applied to the inputs of the nodes in response to the facing direction of the camera that produced the image being the first facing direction, and
    second values of the weights are applied to the inputs of the nodes in response to the facing direction of the camera that produced the image being the second facing direction;
  determine, in response to the mode having been set, set and via the neural network, the representation of the spatial structure of the objects in the image; and
  transmit the representation of the spatial structure of the objects in the image to an automotive navigation system, wherein the automotive navigation system is configured to use the representation of the spatial structure of the objects in the image to determine a distance between the vehicle and a specific object in the image.

\* \* \* \* \*

UNITED STATES PATENT AND TRADEMARK OFFICE
CERTIFICATE OF CORRECTION

| | | |
|---|---|---|
| PATENT NO. | : 11,783,591 B2 | Page 1 of 1 |
| APPLICATION NO. | : 16/898541 | |
| DATED | : October 10, 2023 | |
| INVENTOR(S) | : Pillai et al. | |

It is certified that error appears in the above-identified patent and that said Letters Patent is hereby corrected as shown below:

On the Title Page

Title and in the Specification, Column 1, Lines 1-4: delete "USING A MULTIMODE NEURAL NETWORK TO DETERMINE A REPRESENTATION OF A SPATIAL STRUCTURE OBJECTS IN AN IMAGE" and insert --USING A MULTIMODE NEURAL NETWORK TO DETERMINE A REPRESENTATION OF A SPATIAL STRUCTURE OF OBJECTS IN AN IMAGE--.

In the Claims

Claim 20, Line 21: delete "determine, in response to the mode having been set, set" and insert --determine in response to the mode having been set--.

Signed and Sealed this
Fourteenth Day of November, 2023

Katherine Kelly Vidal
*Director of the United States Patent and Trademark Office*